United States Patent
Robb, Jr.

(10) Patent No.: US 9,651,093 B2
(45) Date of Patent: May 16, 2017

(54) SPHERICAL BEARING TOOL KIT

(71) Applicant: Lawrence M. Robb, Jr., Camden, SC (US)

(72) Inventor: Lawrence M. Robb, Jr., Camden, SC (US)

( * ) Notice: Subject to any disclaimer, the term of this patent is extended or adjusted under 35 U.S.C. 154(b) by 0 days.

(21) Appl. No.: 14/964,336

(22) Filed: Dec. 9, 2015

(65) Prior Publication Data

US 2016/0158925 A1 Jun. 9, 2016

Related U.S. Application Data

(60) Provisional application No. 62/089,774, filed on Dec. 9, 2014.

(51) Int. Cl.
| | |
|---|---|
| *B23P 19/04* | (2006.01) |
| *F16C 43/02* | (2006.01) |
| *B25B 27/06* | (2006.01) |
| *F16C 17/10* | (2006.01) |
| *F16C 23/04* | (2006.01) |

(52) U.S. Cl.
CPC ............ *F16C 43/02* (2013.01); *B25B 27/062* (2013.01); *F16C 17/10* (2013.01); *F16C 23/045* (2013.01); *F16C 2322/50* (2013.01)

(58) Field of Classification Search
CPC ............................. B25B 27/023; F16C 43/02
See application file for complete search history.

(56) References Cited

U.S. PATENT DOCUMENTS

| | | | |
|---|---|---|---|
| 7,322,087 B1 * | 1/2008 | Hu ........................ | B25B 27/023 29/255 |
| 2011/0219617 A1 * | 9/2011 | Barrios ............... | B25B 27/0035 29/894.3 |

* cited by examiner

*Primary Examiner* — Larry E Waggle, Jr.
*Assistant Examiner* — Nirvana Deonauth
(74) *Attorney, Agent, or Firm* — Craig M. Stainbrook; Stainbrook & Stainbrook, LLP

(57) ABSTRACT

A spherical bearing replacement and installation tool, including a removal cup having an open bearing-facing end, a receptacle portion, and a closed base end having a threaded center hole; a removal bolt sized for passage through a through hole in a spherical bearing and threadable insertion into said threaded center hole; a bearing installation clamp assembly including a clamp body portion having a bar disposed between and joining first and second arms, said first arm having a first through hole and said second arm having a second through hole with a threaded bore, said first and second through holes being cylindrical and axially aligned with one another; a staking tool rotationally disposed in said first through hole; and a bearing press rotationally disposed in said second through hole. A method of using the inventive tool is also disclosed.

14 Claims, 9 Drawing Sheets

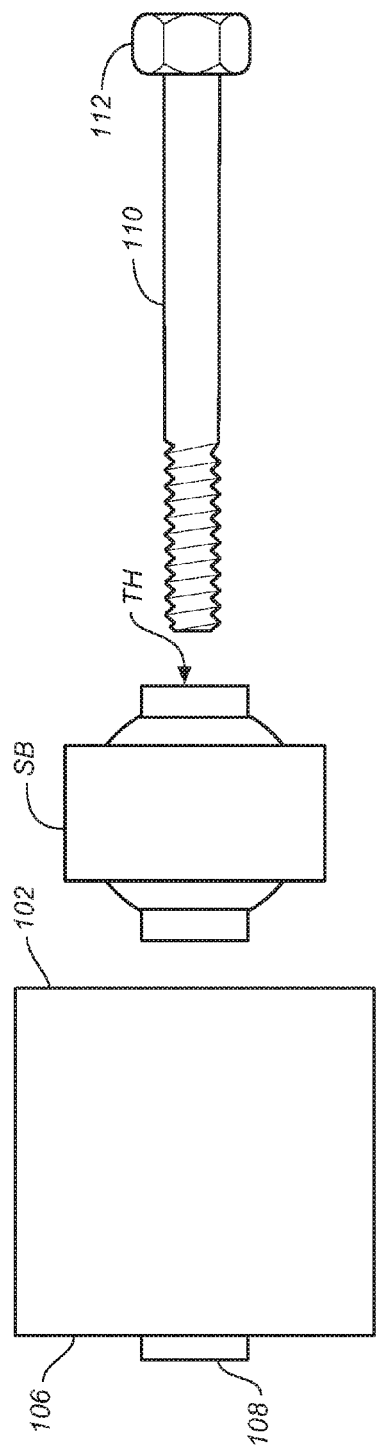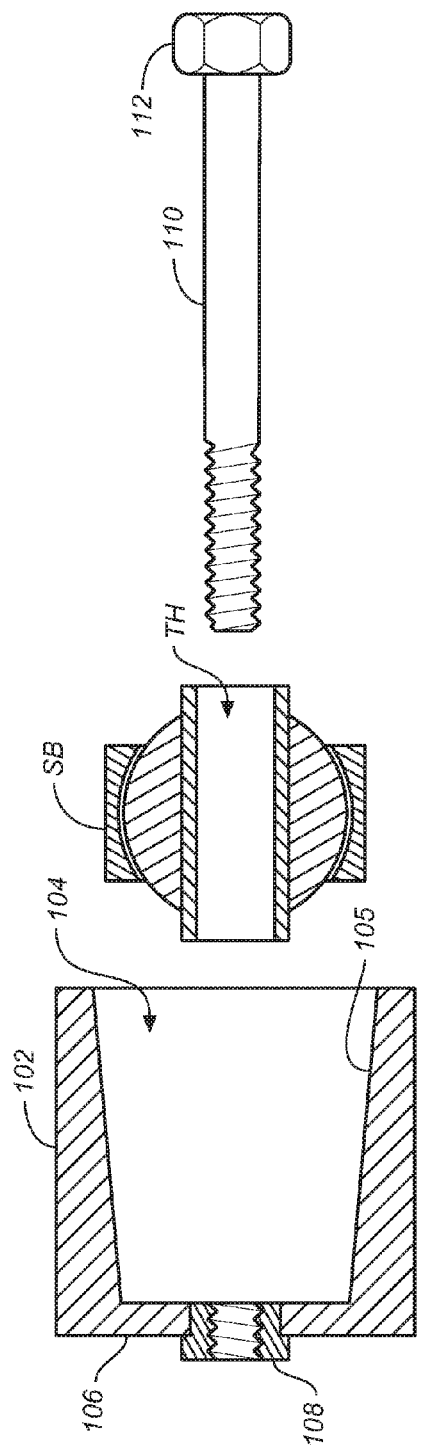
FIG. 3A
FIG. 3B

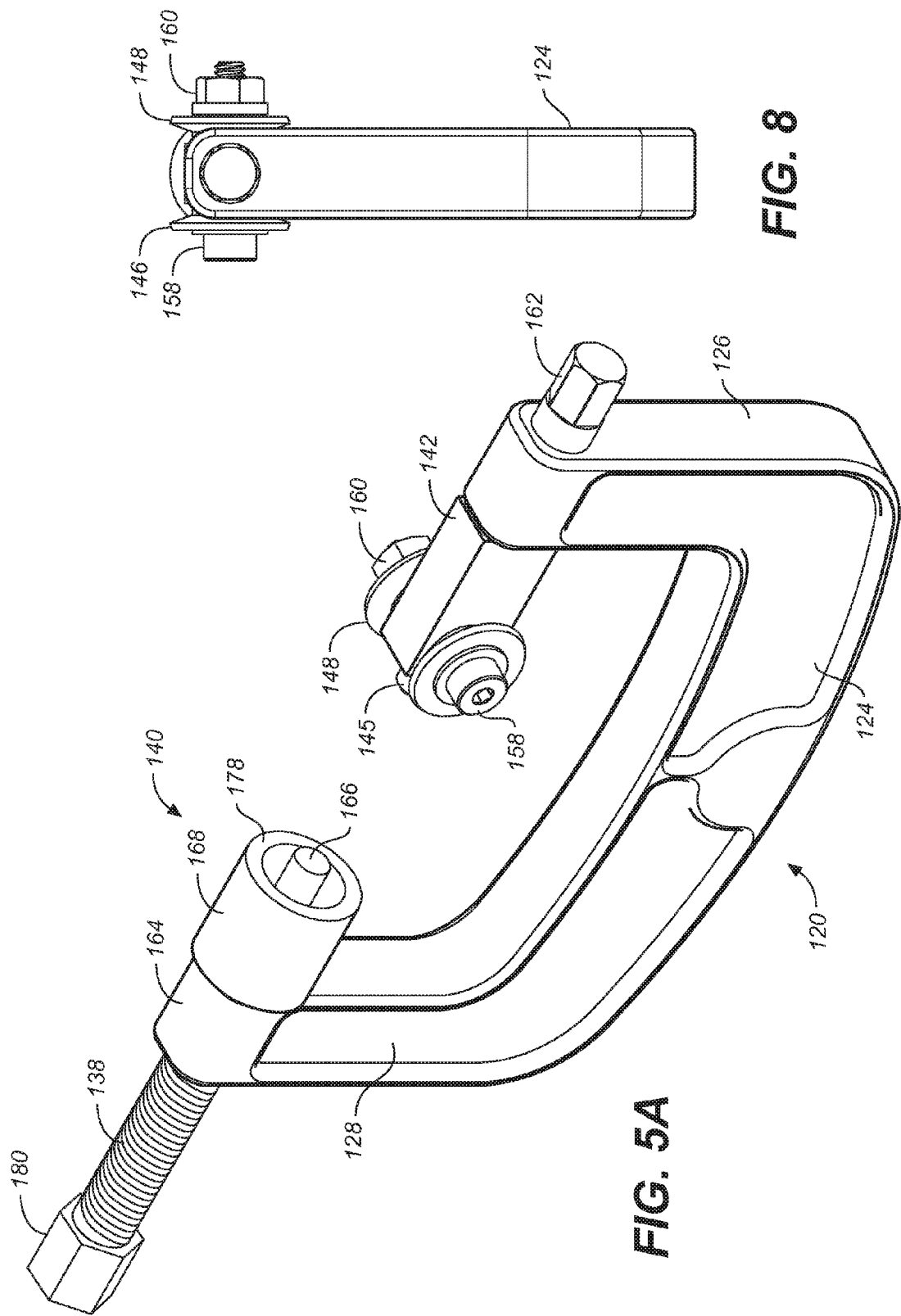

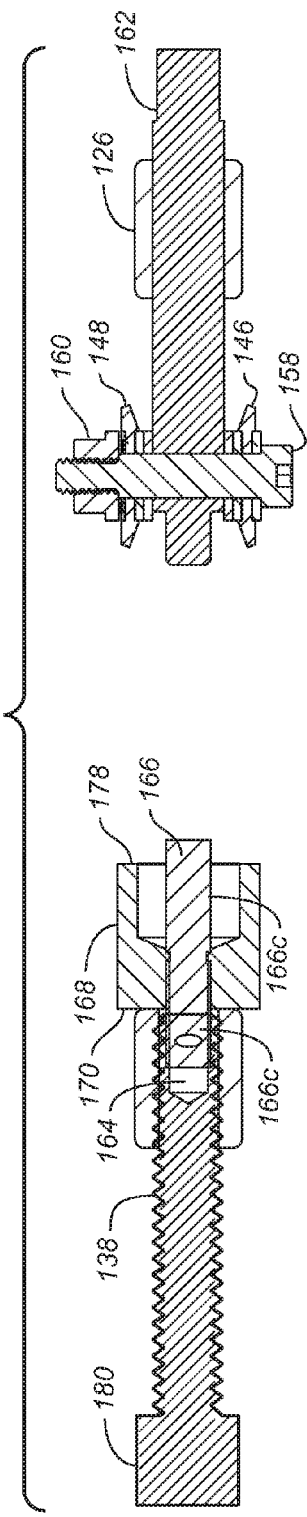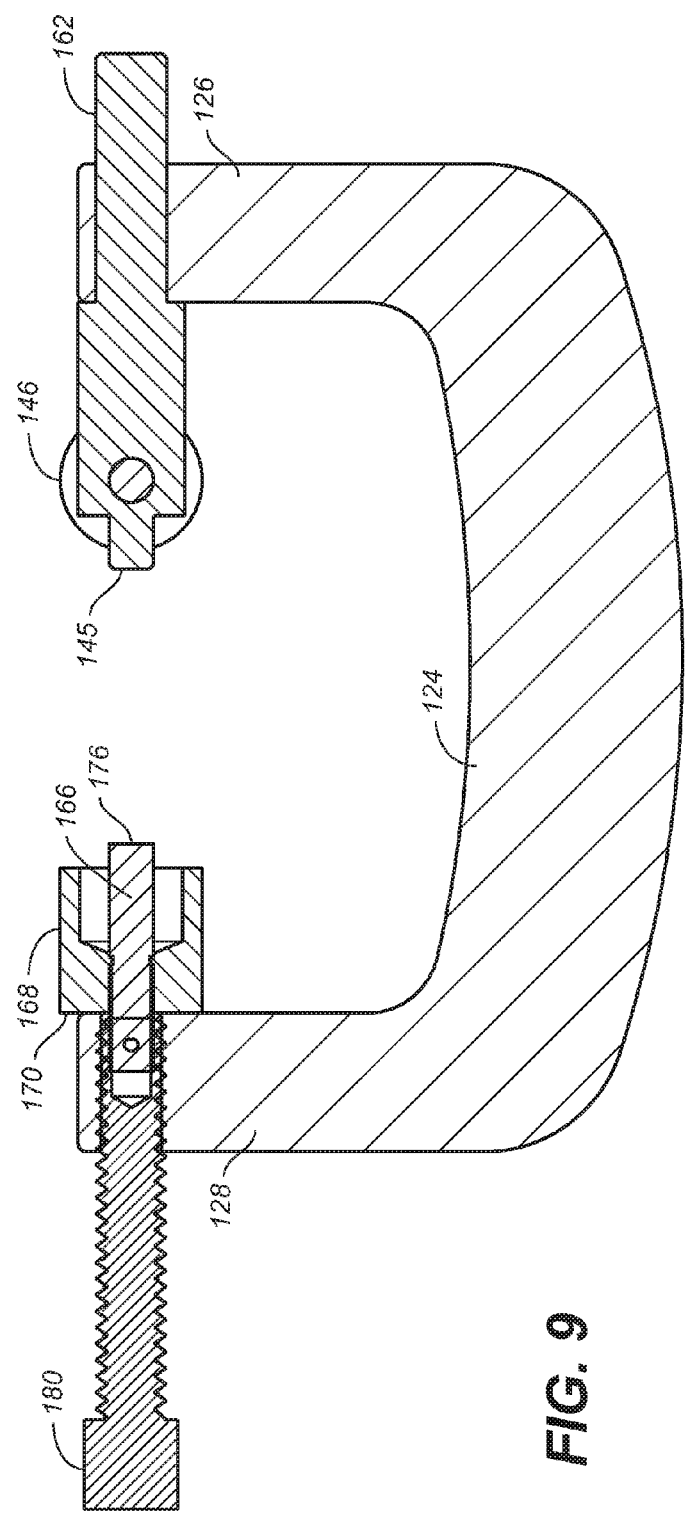

SPHERICAL BEARING TOOL KIT

CROSS REFERENCES TO RELATED APPLICATIONS

The present application claims priority to, and the benefit of the filing date of, U.S. Provisional Patent Application Ser. No. 62/089,774 filed Dec. 9, 2014 (Dec. 9, 2014), incorporated in its entirety by reference herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The present invention relates generally to aviation mechanics' tools for helicopter repair, and more particularly to a tool for replacing spherical bearings, and still more particularly to a swashplate spherical bearing tool kit.

Background Discussion

The Bell 206 JetRanger, along with its military expression in the Bell OH-58 Kiowa Warrior, includes spherical bearings connecting the collective lever and/or the fixed swash to the pitch-and-roll servos through push/pull tubes. The proper functioning of these bearings is critical to airworthiness and flight safety. Any damage or significant wear will adversely affect control and operation in flight, and in-flight failure is catastrophic. Therefore, the bearings are inspected and serviced regularly and serviced both prophylactically and in response to any discernible damage or significant wear, invariably through a wholesale replacement of the part. Unfortunately, the replacement procedure is both labor- and time-intensive and entirely undermines the mission readiness of the involved aircraft. As any soldier or civilian first responder knows, aircraft downtime ultimately translates into lost lives.

For the Bell206/OH-58, the procedure presently used to replace worn or damaged spherical bearing requires removal of the swashplate assembly so that the bearing can be swapped out in the repair shop, rather than in the field. In turn, the swashplate removal requires removal of the main rotor head and rotor blade assembly. This requires at least two mechanics and involves an expenditure of about two man-hours for each mechanic. Next, the forward transmission cowling must be removed. This requires approximately 20 minutes for a skilled mechanic. Then the main rotor control push/pull rods must be disconnected from the swashplate. Each rod disconnection requires about five minutes. The swashplate drive link is also disconnected from the transmission, and this requires about 30 minutes. At this point the filleting and fairing sealing compound (typically ProSeal) must be cut from the swashplate support pylon, and the support pylon is then disconnected from the transmission. Thereafter, the collar set is removed from the main rotor mast assembly, and only then can the swashplate assembly be removed for bearing replacement.

Thus, it takes trained mechanics at least four to five hours simply to get the swashplate prepared for the bearing replacement task, which must then be done on the bench in a fixture (a bench clamp, for instance) in the repair shop, as the bearing must be pressed out and then replaced.

Once the spherical bearing is replaced in the swashplate, the entire swashplate assembly must then be reinstalled, after which it must be inspected by a Technical Inspector and the aircraft then flown by a qualified test pilot. With the mechanical tasks involved and the critical path scheduling of inspectors and pilots considered, the simple spherical bearing replacement job is a three-to-four day job requiring approximately 72 total man-hours.

The inventive tool eliminates all of the above-described preliminary work. The inventive tool kit is sufficiently compact to permit mechanics to access and replace swashplate push/pull tube bearings or any other spherical bearings in the swashplate control system within the very confined area of the air induction fairing and swashplate cowling, without removing the fairing and cowling. Simply put, the inventive tool accomplishes the bearing replacement task while the swashplate is still installed in the aircraft. Further, it can be used to replace the tail rotor control spherical bearings. This will save countless man hours of work and will get the aircraft mission ready in a fraction of the time required when using the conventional procedure and tool set.

BRIEF SUMMARY OF THE INVENTION

The present invention is a spherical bearing tool kit for removing and replacing spherical bearings on the fixed swash of a helicopter swashplate assembly.

It is therefore an object of the present invention to provide a new and improved spherical bearing removal and installation tool that obviates the need to disassemble and remove a helicopter swashplate in order to effect a spherical bearing removal and replacement.

It is another object of the present invention to provide a new and improved kit for the removal and installation of swashplate spherical bearings that dramatically reduces the time needed for the replacement from the approximately 72 total man-hours that the procedure currently requires.

A further object or feature of the present invention is a new and improved spherical bearing removal and installation tool kit that comprises only a few tools.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways.

Also, it is to be understood that the terminology and phraseology employed herein are for descriptive purposes only, and not limitation. Where specific dimensional and material specifications have been included or omitted from the specification or the claims, or both, it is to be understood that the same are not to be incorporated into the appended claims.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein:

FIG. 3A is a side view in elevation of the removal tool positioned for installation on a spherical bearing, which is shown already removed from the housing bore in a bearing horn;

FIG. 3B is a cross-sectional side view in elevation thereof;

FIG. 5A is an upper front right perspective view of the spherical bearing installation tool of the present invention;

FIG. 8 is a right end view in elevation thereof;

FIG. 9 is a cross-sectional front side view in elevation taken along section line 9-9 of FIG. 7; and FIG. 10 is a top plan cross-sectional view taken along section line 10-10 of FIG. 6.

DETAILED DESCRIPTION OF THE INVENTION

Figure 1A:
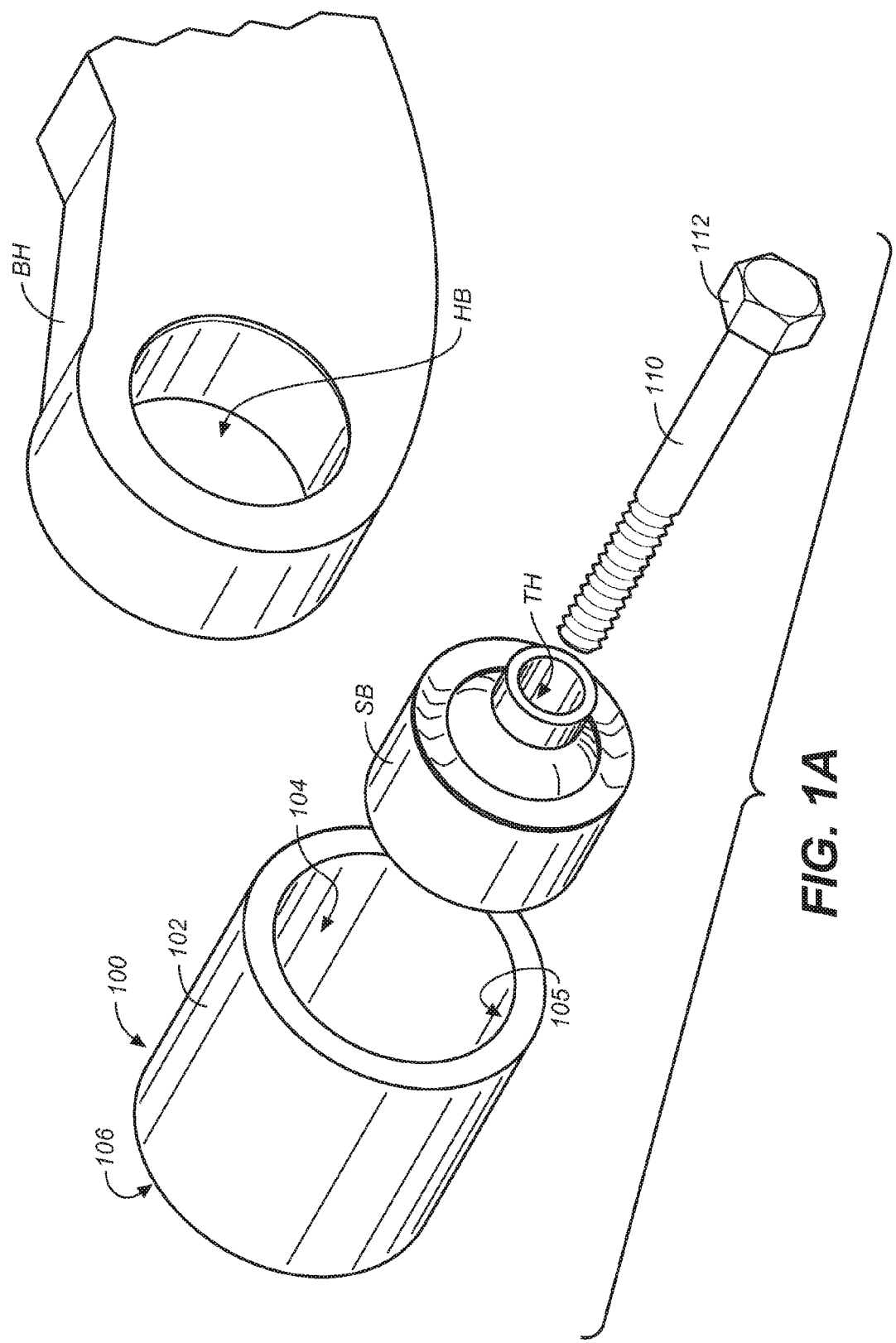
FIG. 1A is an exploded perspective view showing a spherical bearing removal tool alongside a partial view of a swashplate bearing horn and removed spherical bearing, as would be the layout after removal of a spherical bearing from a housing bore disposed in the bearing horn.
Figure 1B:
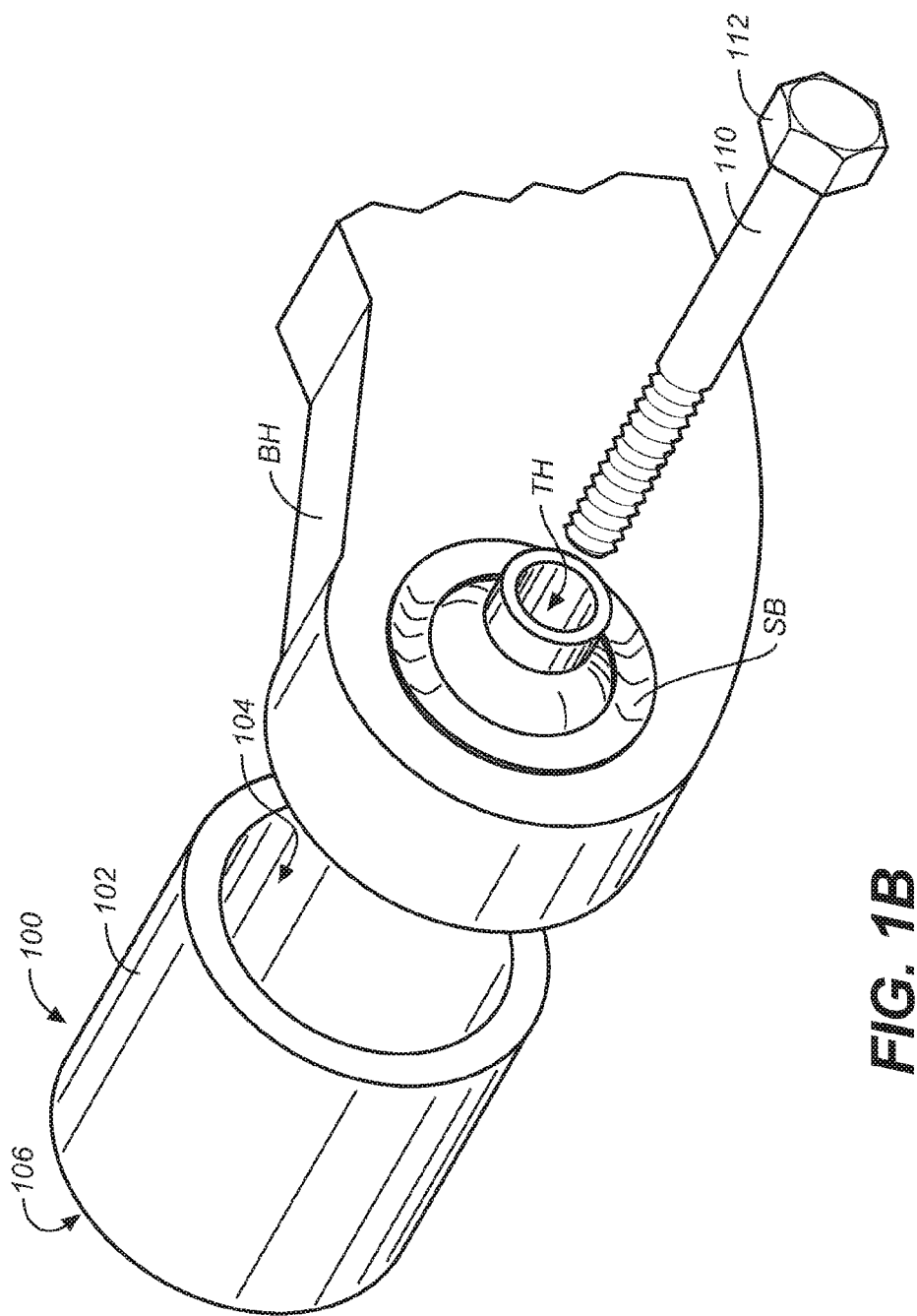
FIG. 1B is a perspective view showing the removal tool poised for placement onto a spherical bearing for use in removing a spherical bearing.
Figure 2A:
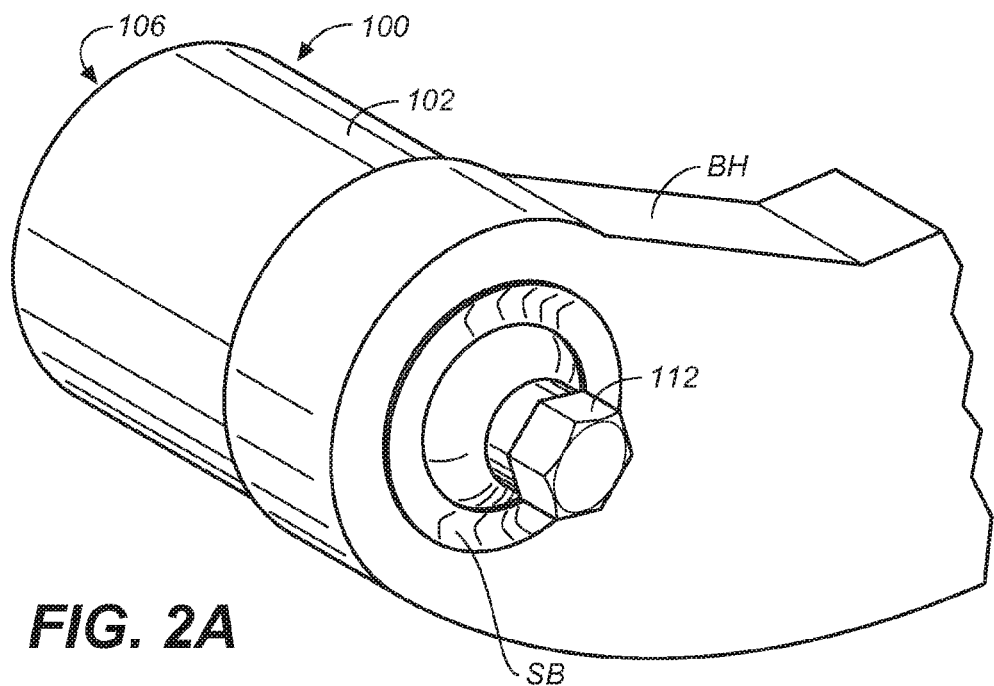
FIG. 2A is a perspective view showing the removal tool installed on a spherical bearing and positioned to commence bearing removal.
Figure 2B:
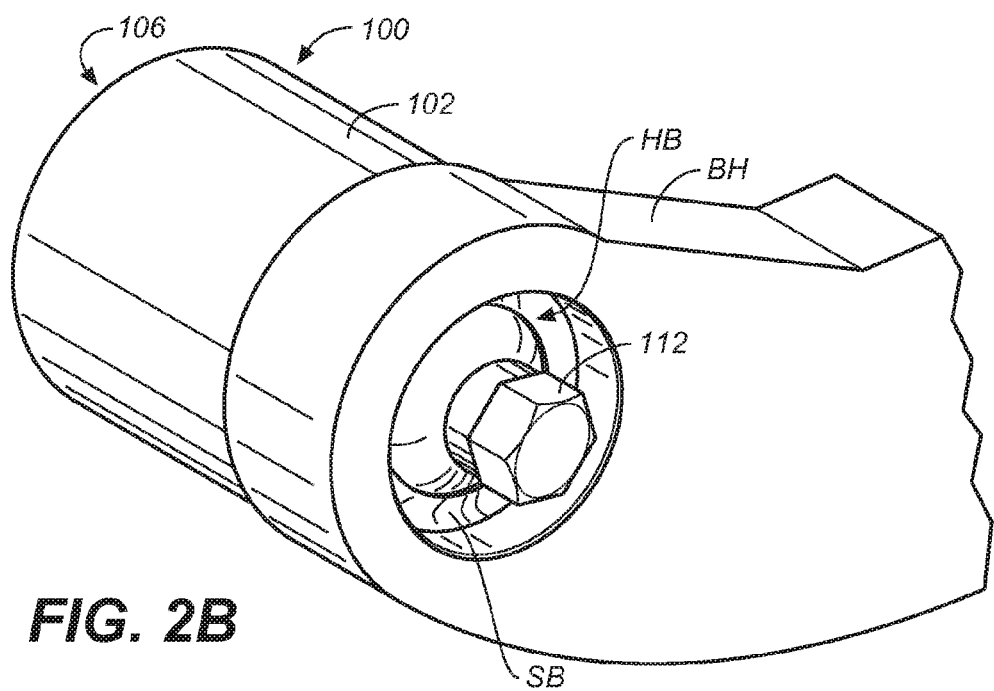
FIG. 2B is the same view showing the removal process underway with the spherical bearing partially urged out of the housing bore and into a bearing removal cup.
Figure 4A:
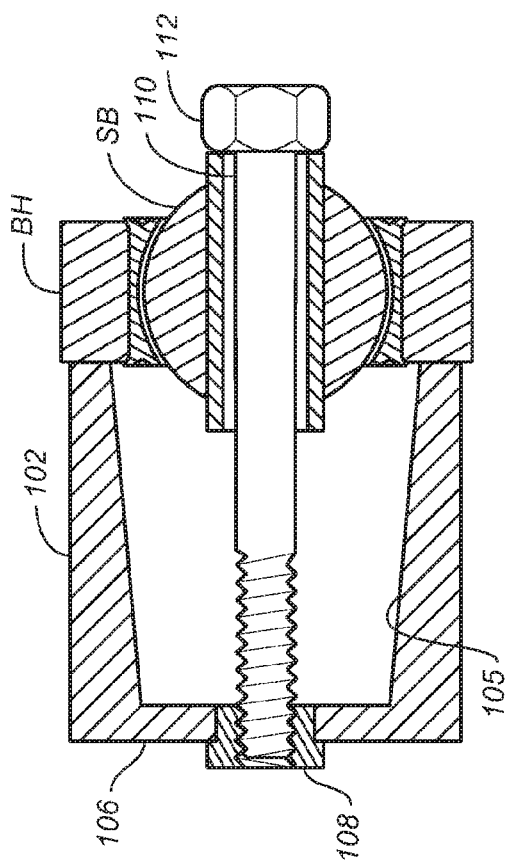
FIG. 4A is a cross-sectional side view in elevation taken along section lines 4A-4A of FIG. 2A.
Figure 4B:
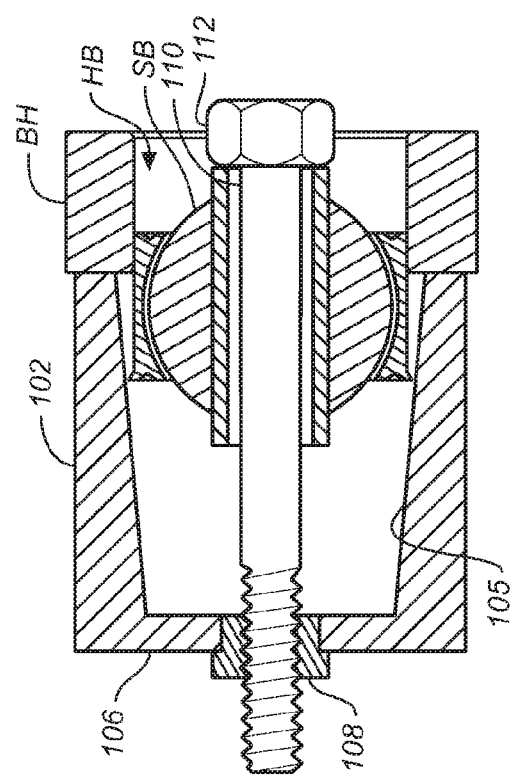
FIG. 4B is a cross-sectional side view in elevation corresponding to the apparatus as shown in FIG. 2B.

Referring first to FIGS. 1A through 4B, wherein like reference numerals refer to like elements and/or features in the various views, there is illustrated therein a new and improved spherical bearing replacement/installation tool. FIGS. 1A through 4B show a spherical bearing removal tool 100, employed to remove a spherical bearing from its housing bore HB in a swashplate bearing horn BH. The removal tool 100 comprises a removal (bearing puller) cup 102 including an open bearing-facing end 103, a receptacle portion 104, and a closed base end 106 having a threaded center hole 108. A removal bolt 110 sized for passage through the spherical bearing through hole TH and threadable insertion into the threaded center hole 86 includes a hex head 90 large enough that when tightened urges (presses) a spherical bearing SB out of its housing bore and into the receptacle portion 82 of the removal cup 80. The interior wall 105 of the receptacle portion 104 tapers gently inward at an approximate 15 degree slope (+/− a few degrees of slope) to create a truncated conical interior. This provides a self-centering function during bearing removal so that the bearing is removed on the axis of the removal bolt and the center of the housing bore and thereby eliminates the danger of distorting the bearing hole in the housing bore due to misalignment.

Referring next to FIGS. 5A through 10, the bearing installation tool of the present invention is a clamp assembly, generally denominated by reference number 120 herein. It includes a C-shaped clamp handle or body portion 122 comprising a bar 124 and first and second (right and left) arms, 126, 128, each of the arms having a longitudinally oriented cylindrical through hole 130, 132, axially aligned with one another, and the first through hole 130 being a smooth bore for rotational insertion of the cylindrical shaft portion 134 of a staking tool 136, and the second through hole 132 being threaded for threadable insertion of a threaded shaft 138 of a bearing press 140.

The staking tool 136 includes, as noted, a cylindrical shaft portion 134, and a staking wheel block 142 with a through hole into which a bolt 144 is disposed, and a mounting pin 145. The bolt 144 functions as an axle on which stake wheels (flare cutters) 146, 148, one each on opposing sides of the block, are disposed, and the mounting pin 145 inserts into the bore hole in a spherical bearing SB being installed and staked, and thus assists in holding it in place while the operation is being performed. The stake wheels are each separated from the wheel block by outer and inner spacers 150a, 150b, and 152a, 152b, respectively, and are contained by an outboard spacer or washer 154, 156, by the bolt head 158, on one end, and a nut 160, on the other. The outer end 162 of the staking tool is hex shaped to facilitate rotation using a socket or box wrench.

The bearing press 140 includes, as noted, a shaft 138, which is at least partially threaded, the end of the shaft 159 having an axial bore 164, into which a guide pin 166 is inserted. The guide pin 166 includes an outer end 166a, a medial groove 166b, and an inner portion 166c, and preferably includes a ball detent 166d for capturing within a bearing seat 168 having a base portion 170 with a center hole having a diameter 172 matching the outer diameter 174 of the guide pin. The guide pin is inserted into the center hole until retained by the ball detent and such that the exposed end 176 of the guide pin extends slightly beyond the rim 178 of the bearing seat 168 (in the preferred embodiment, approximately 0.170 inches beyond the rim). The outer end portion 180 of the threaded shaft is also hex shaped for rotation with a wrench.

Using the bearing puller and spherical bearing tool of the present invention, a Bell 206 JetRanger/OH-58 Kiowa Warrior swashplate spherical bearing is replaced in the following manner:

Referring again to FIGS. 1B through 2B and 4A through 4B, to begin the mechanic disconnects the push/pull tubes from the involved worn spherical bearing SB to expose the bearing horn BH or lug in which the spherical bearing housing bore is disposed as well as the spherical bearing itself. The bearing removal tool 100 is then placed with the receptacle portion 104 facing and placed over the exposed portion of the worn bearing, and the threaded hole 108 of the removal tool is approximately axially aligned with the push/pull through bore, or through hole TH, extending through the spherical bearing. The threaded removal bolt 110 is then inserted through the spherical bearing through hole from the opposing side of the spherical bearing and is passed through the bearing through hole and threaded into the threaded hole 108. The removal bolt is then tightened using a wrench until the spherical bearing is fully displaced from its housing bore HB. At that point the spherical bearing SB attached to the removal tool can be separated and removed from the bearing horn BH.

Next, a replacement bearing RB is placed onto the guide pin 166 of the clamping portion of the bearing press 140. The staking tool 136 is positioned on the opposite side of the housing bore. The bearing press is then turned using a wrench-engaging hex head 180 until the bearing is entirely seated in the housing bore. The staking tool is then rotated using a wrench engaging hex head 162 until the bearing race is staked to the housing on that side. The tool is rotated and the staking tool moved to the other side of the bearing, and the race on that side of the bearing is similarly staked.

Figure 5B:
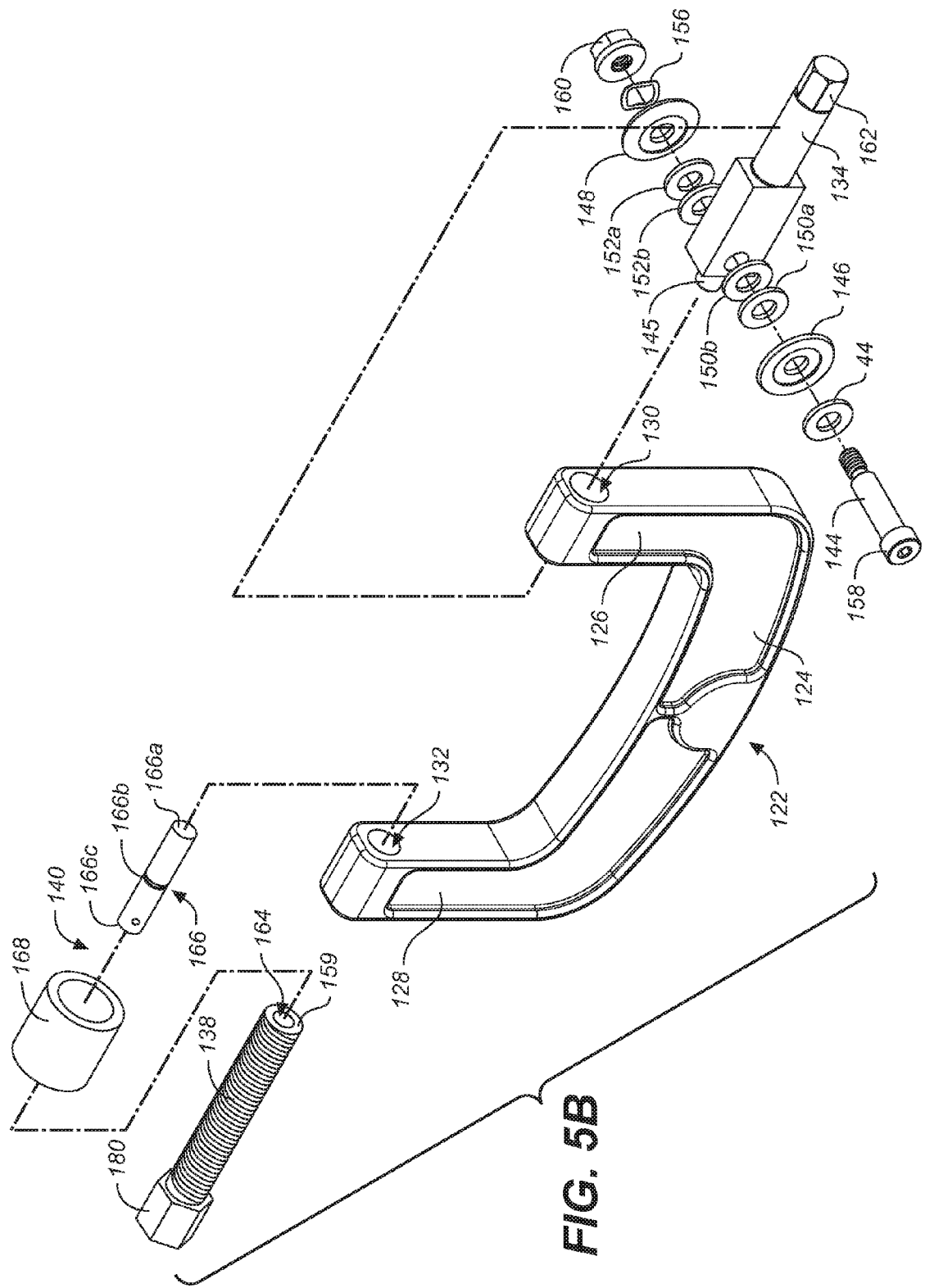
FIG. 5B is an exploded view thereof.
Figure 7:
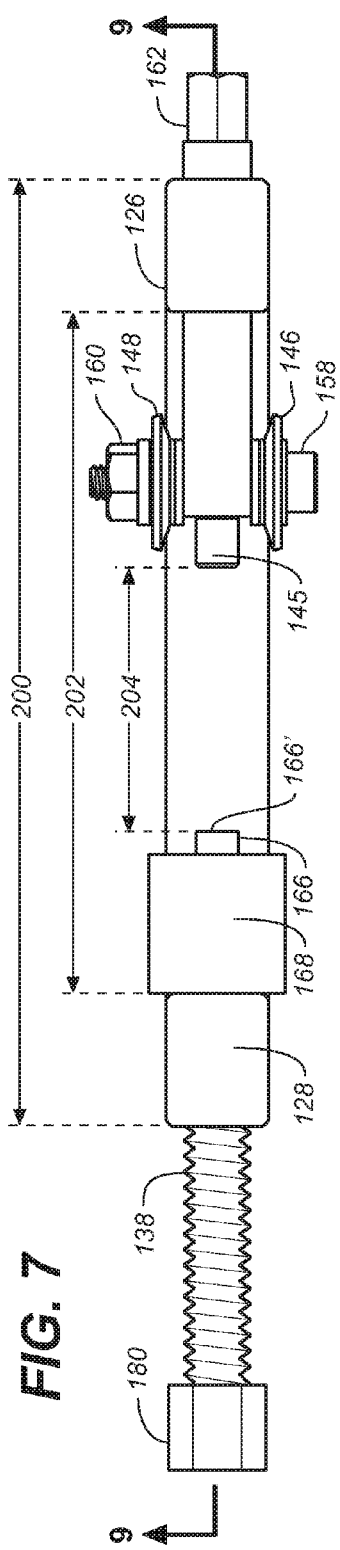
FIG. 7 is a top plan view thereof.
Figure 6:
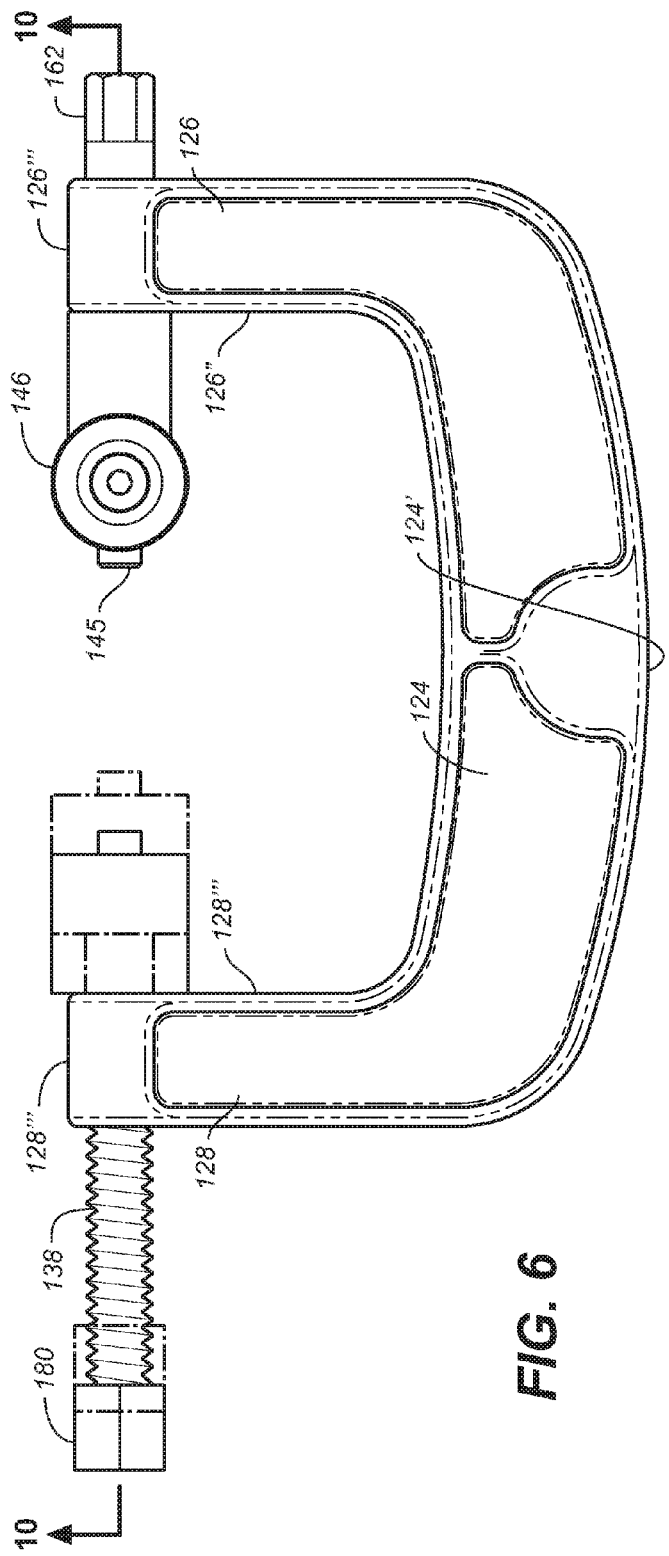
FIG. 6 is a front side view in elevation showing the range of travel of the bearing seat of the spherical bearing installation tool.

It will be appreciated that dimensions of the kit tools are adapted to the clearances required for in-situ removal and installation of swashplate (or other) spherical bearings for the particular aircraft. In other words, the tool may be sized for use on any of a number of different aircraft where clearances are tight and where considerable time may be saved by obviating the need for removal of the bearing lugs or horn so that the spherical bearing replacement can be accomplished in the field. Referring now to FIGS. 5A-5B, for the Bell 206 JetRanger/OH-58 Kiowa Warrior, the more critical dimensions include the following: The clamp handle longitudinal dimension 200 measures 6.95 inches from the outer edge 126' of the right arm 126 and the outer edge 128' of the left arm 128. The longitudinal dimension 202 from the inner edge 126' of the right arm and the inner edge 128" of the left arm is 5.00 inches. The span 204 between the interior tip 166' of the guide pin 166 and the interior tip 145' of the staking tool mounting pin 145 is 1.610 inches. The dimension 206 from the upper edges 126''' and 128''' of the right and left arms 126, 128, to the bottom edge 124' of the clamp handle 124 is 4.25 inches.

From the foregoing, it will be seen that in an embodiment, the spherical bearing tool kit of the present invention comprises a spherical bearing removal and installation tool kit, comprising a clamp assembly having a C-shaped clamp handle with a bar and first and second (right and left) arms, each of said arms having a longitudinally oriented cylindrical through hole, axially aligned with one another, said first through hole being a smooth bore for rotational insertion of the cylindrical shaft portion of a staking tool, and said second through hole being threaded for threadable insertion of a threaded shaft of a bearing press; a staking tool having a cylindrical shaft portion for rotational insertion in said first through hole, a staking wheel block with a through hole into which a bolt is disposed, said bolt providing an axle onto which stake wheels are disposed, one each on opposing sides of said wheel block, said stake wheels each separated from said wheel block by spacers and secured onto said axle by a bolt head on one end and a nut on the other end, wherein said outer end of the staking tool is hex shaped to facilitate rotation using a socket or box wrench; a bearing press including a shaft at least partially threaded for threadable insertion into said second through hole, the end of said shaft having an axial bore, into which a guide pin is inserted and retained by a ball detent, said guide pin including an outer end, a medial groove, and an inner portion, and a ball detent for capturing within a bearing seat having a base portion with a center hole having a diameter matching the outer diameter of the guide pin, said guide pin inserted into said center hole until retained by said ball detent such that an exposed end of said guide pin extends slightly beyond the rim of said bearing seat; and a spherical bearing removal tool including a removal cup having a receptacle portion and a base with a threaded center hole, a removal bolt sized for passage through said spherical bearing hole and threadable insertion into said threaded center hole and including a hex head large enough that when tightened urges a spherical bearing out of its housing bore and into said receptacle portion of said removal cup.

In its most essential aspect, the inventive tool may be seen to be a spherical bearing replacement and installation tool, including a removal cup having an open bearing-facing end, a receptacle portion, and a closed base end having a threaded center hole; a removal bolt sized for passage through a through hole in a spherical bearing and threadable insertion into the threaded center hole; a bearing installation clamp assembly including a clamp body portion having a bar disposed between and joining first and second arms, the first arm having a first through hole and the second arm having a second through hole with a threaded bore, the first and second through holes being cylindrical and axially aligned with one another; a staking tool rotationally disposed in the first through hole; and a bearing press rotationally disposed in the second through hole. A method of using the inventive tool is also disclosed.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A spherical bearing removal and installation tool kit, comprising a clamp assembly having a C-shaped clamp handle with a bar and first and second (right and left) arms, each of said arms having a longitudinally oriented cylindrical through hole, axially aligned with one another, said first through hole being a smooth bore for rotational insertion of a cylindrical shaft portion of a staking tool, and said second through hole being threaded for threadable insertion of a threaded shaft of a bearing press; a staking tool having a cylindrical shaft portion for rotational insertion in said first through hole, a staking wheel block with a through hole into which a bolt is disposed, said bolt providing an axle onto which stake wheels are disposed, one each on opposing sides of said wheel block, said stake wheels each separated from said wheel block by spacers and secured onto said axle by a bolt head on one end and a nut on an other end, wherein an outer end of the staking tool is hex shaped to facilitate rotation using a socket or box wrench; a bearing press including a shaft at least partially threaded for threadable insertion into said second through hole, an end of said shaft having an axial bore, into which a guide pin is inserted and retained by a ball detent, said guide pin including an outer end, a medial groove, and an inner portion, and a ball detent for capturing within a bearing seat having a base portion with a center hole having a diameter matching an outer diameter of the guide pin, said guide pin inserted into said center hole until retained by said ball detent such that an exposed end of said guide pin extends slightly beyond a rim of said bearing seat; and a spherical bearing removal tool including a removal cup having a receptacle portion and a base with a threaded center hole, a removal bolt sized for passage through a spherical bearing hole and threadable insertion into said threaded center hole and including a hex head large enough that when tightened urges a spherical bearing out of a housing bore and into said receptacle portion of said removal cup.

2. A spherical bearing replacement and installation tool comprising: a removal cup having an open bearing-facing end, a receptacle portion, and a closed base end having a threaded center hole: a removal bolt sized for passage through a through hole in a spherical bearing and threadable insertion into said threaded center hole: a bearing installation clamp assembly including a clamp body portion having a bar disposed between and joining first and second arms, said first arm having a first through hole and said second arm having a second through hole with a threaded bore, said first and second through holes being cylindrical and axially aligned with one another: a staking tool rotationally disposed in said first through hole: and a bearing press rotationally disposed in said second through hole: wherein an interior wall of said receptacle portion has an inward taper from said open end to said closed base end: wherein said inward taper has an approximate 15 degree slope (+/−a few degrees of slope) to create a truncated conical interior so as to provide a self-centering function during bearing removal, such that a spherical bearing is removed on an axis of said removal bolt and a center of an housing bore in which the spherical bearing has been installed.

3. The spherical bearing replacement and installation tool of claim 2, wherein said clamp body portion is C-shaped.

4. The spherical bearing replacement and installation tool of claim 2, wherein said staking tool includes a staking wheel block, stake wheels disposed on opposing sides of said staking wheel block, and a cylindrical shaft portion rotationally inserted in said first through hole.

5. The spherical bearing replacement and installation tool of claim 4, wherein said staking wheel block includes a mounting pin, an axle through hole, an axle disposed in said axle through hole on which said stake wheels are rotationally disposed.

6. The spherical bearing replacement and installation tool of claim 5, wherein said mounting pin inserts into a bore hole in a spherical bearing being installed and staked in a bearing horn.

7. The spherical bearing replacement and installation tool of claim 2, wherein said bearing press includes a shaft having a threaded portion, a cylindrical bearing seat disposed on an inner end of said shaft, and a guide pin axially disposed within said bearing seat on said inner end of said shaft.

8. The spherical bearing replacement and installation tool of claim 7, wherein said bearing seat includes a base portion with a center hole disposed around said inner end of said shaft, and a rim.

9. The spherical bearing replacement and installation tool of claim 8, wherein said guide pin extends beyond said rim of said bearing seat.

10. The spherical bearing replacement and installation tool of claim 9, wherein said shaft has an outer end portion shaped for rotation with a wrench.

11. The spherical bearing replacement and installation tool of claim 8, wherein said inner end of said shaft includes an axial bore, and said guide pin is inserted into said axial bore.

12. The spherical bearing replacement and installation tool of claim 11, wherein said guide pin includes an outer end, a medial groove, and an inner portion, said outer end disposed in said axial bore.

13. The spherical bearing replacement and installation tool of claim 12, wherein said guide pin further includes a ball detent removably captured within said bearing seat.

14. The spherical bearing replacement and installation tool of claim 13, wherein said center hole of said bearing seat has a diameter substantially matching an outer diameter of said guide pin.

* * * * *